United States Patent [19]
Hoshino et al.

[11] Patent Number: 6,042,867
[45] Date of Patent: *Mar. 28, 2000

[54] FLOUR BLENDS FOR BREADS, CAKES, OR NOODLES, AND FOODS PREPARED FROM THE FLOUR BLENDS

[75] Inventors: Tsuguhiro Hoshino, Fukuyama; Ryo Yoshikawa, Morioka; Seiji Ito, Morioka; Koichi Hatta, Morioka; Toshiki Nakamura, Morioka; Makoto Yamamori, Tsukuba; Katsuyuki Hayakawa, Iruma-gun; Keiko Tanaka, Iruma-gun; Hajime Akashi, Iruma-gun; Shigeru Endo, Iruma-gun; Seiji Tago; Shinji Ishigami, both of Tokyo, all of Japan

[73] Assignees: Ministry of Agriculture, Forestry and Fisheries Tohoku National Agricultrual Experiment Station, Iwate; Nisshin Flour Milling Co., Ltd., Tokyo, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/783,207

[22] Filed: Jan. 14, 1997

[30] Foreign Application Priority Data

Jan. 18, 1996 [JP] Japan .................................... 8-006523
Jan. 18, 1996 [JP] Japan .................................... 8-006524
Jan. 18, 1996 [JP] Japan .................................... 8-006525

[51] Int. Cl.[7] ........................................................ A21D 2/00
[52] U.S. Cl. .......................... 426/622; 426/94; 426/451; 426/549; 426/554; 426/557
[58] Field of Search .................................... 426/549, 622, 426/554, 451, 557, 94

[56] References Cited

FOREIGN PATENT DOCUMENTS 5-292871  11/1993  Japan .
5-316932  12/1993  Japan .
6-125669   5/1994  Japan .

OTHER PUBLICATIONS

Yamamori et al. Production of a waxy wheat by genetically eliminating wx protein, Jul. 1994.
Nakamura et al. "Production of waxy wheats" Molecular Gene Genetic 248, pp. 253–259, 1995.
Professional Baking, pp. 12–13, 1985.

*Primary Examiner*—Lien Tran
*Attorney, Agent, or Firm*—Sugrue, Mion, Zinn, Macpeak & Seas, PLLC

[57] ABSTRACT

Flour blends are described containing waxy wheat flour and are suitable for the preparation of breads, cakes, or noodles. These flour blends make it possible to obtain foods which do not show degraded texture after prolonged storage, and which particularly provide an excellent texture when consumed after being frozen and thawed.

22 Claims, No Drawings

FLOUR BLENDS FOR BREADS, CAKES, OR NOODLES, AND FOODS PREPARED FROM THE FLOUR BLENDS

TECHNICAL FIELD

The present invention relates to a novel flour blend for breads, cakes, or noodles. The invention also relates to breads, cakes, and noodles prepared from the flour blends. The breads, cakes, and noodles of the invention do not have deteriorated texture after storage for a prolonged period, and in particular, they provide excellent texture even after they are stored in a refrigerator or are thawed after being frozen.

BACKGROUND OF THE INVENTION

Various types of breads have been developed so as to meet diversified consumer needs.

The breads are prepared from wheat flour, inter alia hard wheat flour obtained from hard-type wheat with a high protein content, such as Canada Western Red Spring wheat produced in Canada, Hard Red Winter wheat and Hard Red Spring wheat produced in the U.S., and Prime Hard wheat produced in Australia.

Breads prepared from hard wheat flour tend to lose moisture or invite staling of pasted starch when they are placed in show-cases of bakery shops at room temperature for a prolonged period. Such damaged breads become hard, and they often provide dry and rough texture and poor flavor. This tendency becomes more pronounced when breads are stored at low temperatures in a refrigerator.

It is also noted that when frozen breads prepared from hard wheat flour are thawed with the application of heat in a microwave oven, excessive loss of moisture or excessive denaturation of protein tends to occur, and the breads become hard, providing a sticky texture and poor flavor.

In order to solve the above-mentioned disadvantages, additives such as emulsifiers and gellatinized starch have conventionally been used as retrogradation preventive agents. Also, from the aspect of blending the starting materials, i.e., wheats, there have been employed several methods including (1) a method in which hard wheat flour is blended with soft wheat flour obtained, for example, from Norin 61 or Horoshiri wheat produced in Japan or from Australian Standard White wheat produced in Australia and/or from Western White wheat produced in the U.S. or from Soft wheat produced in Australia, or even with starch in some cases; and (2) a method in which hard wheat flour is not used; i.e., only semi-hard wheat flour and soft wheat flour are used.

However, the above-mentioned approaches cannot satisfactorily prevent deterioration of texture of breads, as they provide insufficient retrogradation preventive effect. Also from the viewpoint of health of consumers, addition of retrogradation preventive agents is not favorable. Moreover, when frozen breads prepared by the use of any one of the above-described improved methods are tasted after thawing, stickiness and hardness are decreased to provide somewhat better texture. On the other hand, moisture-retaining ability of the product decreases so that the product easily dries up and invites accelerated retrogradation. Furthermore, there is involved another disadvantage that the breads come to form lumps in the mouth, which are difficult to melt in the mouth. In order to overcome the above disadvantages involved in frozen breads, addition of auxiliary materials such as saccharides, oils and fats, etc. has also been studied. However, no satisfactory results have been obtained.

Cakes are prepared from soft wheat flour obtained from wheat, inter alia, soft wheat with a low protein content such as Western White wheat produced in the U.S. and Soft wheat produced in Australia.

When stored in refrigerators, cakes prepared from soft wheat flour tend to lose moisture or invite retrogradation of pasted starch. Such affected cakes become hard, and often provide dry and rough texture and poor flavor.

It is also noted that when sponge cakes, etc. prepared from soft wheat flour are stored in a frozen state and thawed at room temperature or in refrigerators, they provide poor flavor and disagreeable dry texture with lack of softness.

In order to solve the above-mentioned disadvantages, additives such as emulsifiers, gellatinized starch, modified starch, etc. have conventionally been used as retrogradation preventive agents. However, use of such additives does not provide satisfactory retrogradation preventive effects, but impede the flavor of cakes. Also, from the viewpoint of consumers' health, additives are not desirable. In addition, there is involved another disadvantage that when cakes prepared through use of such improved methods are thawed after being stored in a frozen state, they provide a sticky texture to the teeth and form lumps in the mouth, which are difficult to melt in the mouth.

In order to overcome the above disadvantages, addition of auxiliary materials such as saccharides, oils and fats, etc. has also been studied. However, no satisfactory results have been obtained.

Generally speaking, noodles such as udon, soba, and Chinese type noodles are prepared from a blend of flours including wheat flour, which is the primary component, and buckwheat flour, rice flour, barley flour, starch, etc. as required; plus salt, kansui, emulsifiers, gelling agents, colorants, etc. if necessary.

In recent years, the market is strongly oriented towards noodles of soft and thick or viscoelastic texture, and therefore, it is attempted to improve texture of noodles by the addition of starches, emulsifiers, or gelling agents. This trend is more clearly seen in boiled noodles that are stored in refrigerators or ambient temperature as well as in frozen noodles. This is because in the case of boiled noodles and frozen noodles which are stored in their gellatinized starch state, texture significantly deteriorates and they present weakened thick texture after being stored and re-heated, as compared to noodles that have been freshly boiled.

Use of those additives provides a soft and viscoelastic texture to some extent. However, the effect is not sufficient and there are drawbacks that taste and flavor are sometimes adversely affected.

In the meantime, it is accepted that deterioration in texture of boiled noodles is partly due to retrogradation of gelatinated starch. Starch is composed of linear amylose and amylopectin, wherein glucose units are linked by $\alpha$1-4 linkages, but the latter also contains some branching $\alpha$1-6 bonds. Starch that contains only very small amounts of amylose is called waxy starch. It has been attempted to overcome deterioration of texture attributed to retrogradation by means of adding, to noodles, materials with a high content of waxy starch, such as waxy rice flour, waxy rice starch, waxy corn flour, and waxy cornstarch. Such attempts have not yet produced satisfactory results.

DISCLOSURE OF THE INVENTION

The present inventors carried out careful studies in an attempt to solve the above-described drawbacks, and found that breads, cakes, and noodles prepared from a flour blend containing waxy wheat flour are free from the above-mentioned drawbacks, and provide excellent texture when tasted after storage at room temperature for a prolonged period, or after being thawed following storage in refrigerators or freezers. The present invention was accomplished based on this finding.

Accordingly, the present invention provides a flour blend for breads, cakes, and noodles, containing waxy wheat flour.

The present invention also provides foods selected from breads, cakes, and noodles prepared from a flour blend containing waxy wheat flour.

DETAILED DESCRIPTION OF THE INVENTION

In the present invention, the term waxy wheat flour refers to the wheat flour with an amylose content of not more than 10%. An example of waxy wheat flour is flour obtained from the waxy wheat created by the two inventors of the present invention and described in Japanese Patent Application Laid-Open (kokai) No. 6-125669, which has an amylose content of 0%. This waxy wheat is created according to the method described in that publication. Briefly, a hexaploid wheat which lacks expression of the WX-A1 gene and the WX-B1 gene but maintains expression of the WX-D1 gene is crossed with a hexaploid wheat which lacks only expression of WX-D1 to thereby obtain individuals of the first filial generation. The thus-obtained individuals are self-fertilized to obtain individuals of the second filial generation, from which those lacking expression of the above-mentioned three genes are selected. Alternatively, the waxy tetraploid wheat may be created by crossing a hexaploid which lacks expression of the WX-A1 gene and the WX-B1 gene among the three genes with an individual of tetraploid wheat (genomic constitution: AABB). The entire contents of Japanese Patent Application Laid-Open (kokai) No. 6-125669 is incorporated herein by reference.

The above-mentioned waxy wheat is characterized in that its amylose content is 0%. When this wheat is crossed with non-waxy wheat and then selected according to customary methods, it is possible to obtain waxy wheat whose amylose content is not more than 10%.

The method for creating waxy wheat is not limited to that described above. Waxy wheat which is suitable to perform the present invention may also be obtained through radioactive irradiation or chemical mutagenesis treatment. It is also possible to select the wheat species with amylose content of not more than 10% from among species grown by use of such irradiated or chemically-treated wheat as a mother plant.

The content of waxy wheat flour in the flour of the present invention differs in accordance with the end use of the flour. Preferably, the content is between 0.5 and 70% by weight. The flour of the present invention may also contain one or more members selected from the group consisting of non-waxy wheat flour, rye flour, starch, buckwheat flour, rice flour, and barley flour. The term non-waxy wheat flour refers to ordinary wheat flour other than waxy wheat flour.

Of the flour blends of the present invention, those for preparing breads preferably contain waxy wheat flour in an amount between 0.5 and 30% by weight, more preferably between 1 and 20% by weight, with the remaining parts being hard, semi-hard, or soft non-waxy wheat flour, rye flour, starch, etc. If the content of waxy wheat flour in the flour blend is less than 0.5% by weight, sufficient retrogradation preventive effect of the present invention cannot be obtained. On the other hand, if the content is in excess of 30% by weight, the resultant breads may become hard.

Of the flour blends of the present invention, those for preparing cakes preferably contain waxy wheat flour in an amount between 1 and 30% by weight, more preferably between 1 and 20% by weight, with the remaining parts being hard, semi-hard, or soft non-waxy wheat flour, rye flour, starch, etc.

Of the flour blends of the present invention, those for preparing noodles preferably contain waxy wheat flour in an amount between 5 and 70% by weight, more preferably between 10 and 60% by weight, with the remaining parts being non-waxy wheat flour, buckwheat flour, rice flour, barley flour, starch, etc. If the content of waxy wheat flour in the flour blend is less than 5% by weight, the soft and viscoelastic texture may not always be obtained. On the other hand, if the content is in excess of 70% by weight, the viscoelasticity becomes excessively strong, which may provide a texture different from that of common noodles.

The flour blend of the present invention may be obtained by manufacturing (or milling) waxy wheat flour and other flours separately and then blending the resultant flours. Alternatively, waxy wheat and other cereal grains may be blended and then milled.

In the present invention, the term breads is used to refer to those which are usually prepared and sold in bakery shops; i.e., those which are prepared by causing a dough made primarily of flours such as wheat flour to ferment by the aid of yeast, etc. Examples of breads include English bread, French bread, pastries, roll breads such as butter roll, buns, fried doughs such as doughnuts, steamed doughs such as steam bread and pizzas.

The breads of the present invention are prepared as follows. A flour blend containing the aforementioned waxy wheat flour is mixed with a variety of additives which are generally used in the preparation of breads; i.e., yeast, baking chemicals such as sodium bicarbonate, yeast food (yeast nutrient), salt, sugar, oils and fats, egg, milk products, water, etc., and the mixture is kneaded to thereby obtain a dough. The dough is then caused to rise through fermentation, and then baked or deep-fried. The breads of the present invention may be prepared by use of any process, apparatus, freezing method, and freezer that have conventionally been used. Moreover, in addition to the aforementioned materials, dried fruits, spices, and other additives such as vitamins and minerals that are widely used in baking may also be incorporated. Examples of known processes for preparing breads and examples of additives are described, for example, in "Quality Breads of Japan" by Century Enterprise Co., Ltd., the entire disclosure of which is incorporated herein by reference.

The breads of the present invention may be stored at room temperature, in refrigerators, or in a frozen state. Breads stored in a refrigerator may be eaten as they are or after being warmed in a microwave oven. Frozen breads are consumed after being heated and thawed in a microwave oven or a similar apparatus.

In the present invention, the term cakes is used to refer to those which are usually prepared and sold in bakery shops and cake shops; i.e., those which are prepared by causing a batter made primarily of flours such as wheat flour to expand by the aid of egg white or baking powder. Examples of cakes which make use of the rising of egg white include sponge cakes, castilla, and butter cakes. Examples of cakes which make use of baking powder include pancakes and mousses.

The cakes of the present invention are prepared as follows. A flour blend for cakes is mixed with a variety of ingredients which are generally used in the manufacture of cakes; i.e., egg white, oils and fats, baking chemicals such as baking powder, and if necessary, salt, sugar, oils and fats, milk product, liquor, etc., and the resultant mixture is mixed to thereby obtain a batter. The batter is then caused to rise during baking. The cakes of the present invention may be prepared by use of any process, apparatus, freezing method, and freezer that have conventionally been used in the manufacture of cakes. Moreover, in addition to the aforementioned ingredients, there may also be added dried fruits, spices, and other additives such as vitamins and minerals that are widely used in the manufacture of cakes. Examples of known processes for making cakes and examples of additives are described, for example, in "Soft Wheat: Production, Breeding, Milling, and Uses" edited by W. T. Yamazaki and C. T. Greenwood (published by AACC), the entire disclosure of which is incorporated herein by reference.

In the present invention, the term noodles is used to collectively refer to those which are usually known to people as noodles, including raw noodles, boiled noodles, dry noodles, steamed noodles, instant noodles, frozen noodles, etc.

The noodles of the present invention are prepared by a conventional method except that a flour blend containing the aforementioned waxy wheat flour is used. Examples of known processes for preparing noodles are described, for example, in "Pasta and Noodle technology" edited by James E. Kruger, Robert B. Matsuo, and Joel W. Dick (published by AACC), the entire disclosure of which is incorporated herein by reference.

In the breads prepared from the flour blend of the present invention, retrogradation proceeds very slowly. Therefore, they do not provide a hard texture even after they are stored at room temperature for a prolonged period or stored in refrigerators; they provide an excellent moist texture which is very close to that of freshly baked bread. Moreover, because the breads of the present invention have enhanced moisture retainability, they are particularly suitable for being heated in microwave ovens. They do not become dry or hard—which textures are attributed to loss of moisture during heating—even when heated in a microwave oven, and retain an excellent texture for a prolonged period. Accordingly, the flour blend of the present invention is advantageously used in the preparation of frozen breads that are consumed after being heated and thawed in a microwave oven or a similar apparatus.

In the cakes prepared from the flour blend of the present invention, retrogradation proceeds very slowly. Moreover, their moisture retainability is prominent. Therefore, when tasted after being stored in refrigerators, the cakes of the invention are not hard but provide an excellent texture very close to that of freshly baked cakes. Moreover, even after the cakes are thawed in a refrigerator or at room temperature, or in some cases, in a microwave oven following long-term storage in a frozen state, they do not become hard but provide a soft and excellent texture.

Moreover, through use of the flour blend of the present invention, it is possible to obtain noodles which permit storage for a prolonged period, and which do not provide degraded texture after a prolonged storage.

EXAMPLES

The present invention will next be described by way of examples.

Example 1

The below-listed materials were used to prepare butter rolls in accordance with the process described below. The proportions by weight of waxy flour and other flour are shown in Table 1.

| Materials: | |
| --- | --- |
| Normal flour other than the below-described waxy wheat flour | X g |
| Waxy wheat flour (obtained in Ex. 2 of JP-A-6-125669) | (1000 − X) g |
| Yeast | 25 g |
| Salt | 16 g |
| Sugar | 150 g |
| Shortening oil | 130 g |
| Egg | 150 g |
| Powdered skim milk | 20 g |
| Yeast food | 1.5 g |
| Water | 480 g |

Process for Preparing Butter Rolls (1) Mixing: The above-listed ingredients other than shortening were put in a mixer and mixed for 2 minutes at a low speed (98 revolutions/min) and then for 4 minutes at a high speed (295 revolutions/min). Subsequently, shortening was added and mixing was performed for a further 2 minutes at a low speed and then for 6 minutes at a high speed (Mixing temperature: 27° C.).

(2) Fermentation: Eighty (80) minutes without punching (Temperature: 27° C., Humidity: 70%)

(3) Cutting: 40 g/piece (4) Bench time: Fifteen (15) minutes (Room temperature)

(5) Forming: Ordinary forming for butter rolls (6) Proofer: Fifty (50) minutes (Temperature: 42° C., Humidity: 85%)

(7) Baking: Nine (9) minutes (Temperature: 210° C.)

TABLE 1

| Test No. | Waxy wheat flour (%) | Hard wheat flour* (%) | Waxy cornstarch (%) | Waxy rice flour (%) | Tapioca starch (%) |
| --- | --- | --- | --- | --- | --- |
| 1 | 0.3 | 99.7 | — | — | — |
| 2 | 0.5 | 99.5 | — | — | — |
| 3 | 1 | 99 | — | — | — |
| 4 | 2 | 98 | — | — | — |
| 5 | 5 | 95 | — | — | — |
| 6 | 10 | 90 | — | — | — |
| 7 | 20 | 80 | — | — | — |
| 8 | 30 | 70 | — | — | — |
| 9 | 40 | 60 | — | — | — |
| 10 | 50 | 50 | — | — | — |
| 11 | — | 100 | — | — | — |
| 12 | — | 85 | 15 | — | — |
| 13 | — | 85 | — | 15 | — |
| 14 | — | 85 | — | — | 15 |

*Wheat flour obtained by milling 100% Canada Western Red Spring wheat 61 produced in Canada.

The thus-prepared butter rolls were evaluated by 10 panelists in terms of their flavor and texture in accordance with the evaluation standards shown in Table 2, and average ratings were obtained.

The evaluation regarding flavor and texture was made on butter rolls that had been left to cool at room temperature for 1 hour after being baked, butter rolls that had been stored for 24 hours at room temperature after standing at room temperature for 1 hour, and butter rolls that had been stored for 24 hours in a refrigerator of 4° C.

Moreover, freshly baked butter rolls were placed in a deep freezer (interior temperature: −40° C.), and frozen for 20 minutes to thereby prepare frozen butter rolls. The frozen butter rolls were stored in a −18° C. freezer for 10 days, and thereafter, the butter rolls were heated and thawed in a microwave oven for 1 minute. The flavor and texture of the butter rolls that had thus been heated and thawed were evaluated in a manner similar to that described above.

The results are shown in Table 3.

TABLE 2

Flavor

| | | |
|---|---|---|
| Taste: | 5: | Excellent taste with rich flavor |
| | 4: | Fair taste and flavor |
| | 3: | Moderate taste and flavor |
| | 2: | Very slight taste and flavor |
| | 1: | No taste and no flavor |
| Smell: | 5: | Strong sweet smell |
| | 4: | Relatively strong sweet smell |
| | 3: | Hint of sweet smell with acidic odor |
| | 2: | Very slight sweet smell with strong acidic odor |
| | 1: | Bad smell and disagreeable |

Texture

| | | |
|---|---|---|
| Touch to the teeth: | 5: | Crispy and very smoothly cut by the teeth |
| | 4: | Slightly crispy and relatively smoothly cut by the teeth |
| | 3: | Relatively sticky and relatively poorly cut by the teeth |
| | 2: | Relatively lumpy and somewhat poorly cut by the teeth |
| | 1: | Lumpy and somewhat poorly cut by the teeth |
| Hardness: | 5: | Crumbly and light texture, soft feel to the mouth |
| | 4: | Relatively crumbly and slightly light texture, soft feel to the mouth |
| | 3: | Relatively soft but somewhat excessively elastic |
| | 2: | Slightly hard and very elastic |
| | 1: | Hard and rough feel to the mouth |
| Meltaway characteristics: | 5: | Smoothly melt in the mouth, distinctive meltaway characteristics |
| | 4: | Good meltaway characteristics |
| | 3: | Fair meltaway characteristics |
| | 2: | Slightly poor meltaway characteristics |
| | 1: | Poor meltaway characteristics with lumps being formed |

TABLE 3

| | | Freshly made | | | | | after storage at room temperature | | | | |
|---|---|---|---|---|---|---|---|---|---|---|---|
| | | Flavor | | Texture | | | Flavor | | Texture | | |
| Test No. | Volume (C.C) | Taste | Smell | Touch to the teeth | Hardness | Meltaway | Taste | Smell | Touch to the teeth | Hardness | Meltaway |
| 1 | 260 | 1.7 | 4.6 | 4.3 | 4.5 | 4.5 | 4.2 | 4.1 | 3.2 | 3.5 | 3.7 |
| 2 | 260 | 4.8 | 4.6 | 4.4 | 4.5 | 4.4 | 4.3 | 4.1 | 3.5 | 3.9 | 3.6 |
| 3 | 275 | 4.8 | 4.5 | 4.3 | 4.6 | 43 | 4.3 | 4.1 | 3.7 | 4.3 | 3.6 |
| 4 | 285 | 4.7 | 4.5 | 4.1 | 4.6 | 4.2 | 4.3 | 4.0 | 3.9 | 4.4 | 3.4 |
| 5 | 295 | 4.7 | 4.5 | 4.0 | 4.7 | 4.3 | 4.2 | 4.0 | 3.9 | 4.6 | 3.6 |
| 6 | 300 | 4.7 | 4.4 | 3.8 | 4.5 | 4.1 | 4.2 | 3.9 | 3.7 | 4.5 | 3.8 |
| 7 | 300 | 4.6 | 4.3 | 3.6 | 4.5 | 3.8 | 4.2 | 3.9 | 3.5 | 4.3 | 3.6 |
| 8 | 290 | 4.5 | 3.9 | 3.4 | 4.4 | 3.5 | 4.0 | 3.7 | 3.4 | 4.1 | 3.3 |
| 9 | 270 | 4.0 | 3.4 | 3.1 | 4.0 | 3.1 | 3.6 | 3.0 | 3.0 | 3.9 | 2.9 |
| 10 | 250 | 3.6 | 3.0 | 2.6 | 3.8 | 2.8 | 3.2 | 2.8 | 2.5 | 3.7 | 2.6 |
| 11 | 260. | 4.8 | 4.6 | 4.4 | 4.5 | 4.5 | 4.2 | 4.1 | 3.2 | 3.0 | 3.7 |
| 12 | 245 | 3.3 | 2.4 | 2.8 | 2.4 | 2.8 | 2.9 | 2.2 | 2.6 | 2.3 | 2.4 |
| 13 | 240 | 3.8 | 3.2 | 2.9 | 2.5 | 45 | 3.3 | 2.8 | 2.6 | 2.4 | 2.2 |
| 14 | 240 | 2.6 | 2.2 | 2.2 | 2.6 | 2.4 | 2.4 | 2.0 | 2.0 | 2.4 | 2.0 |

| | after storage in a refrigerator | | | | | Heated and thawed after storage in a freezer | | | | |
|---|---|---|---|---|---|---|---|---|---|---|
| | Flavor | | Texture | | | Flavor | | Texture | | |
| Test No. | Taste | Smell | Touch to the teeth | Hardness | Meltaway | Taste | Smell | Touch to the teeth | Hardness | Meltaway |
| 1 | 3.7 | 3.8 | 2.6 | 2.4 | 2.6 | 4.0 | 3.8 | 2.6 | 2.5 | 2.7 |
| 2 | 3.9 | 3.9 | 2.8 | 8.7 | 3.0 | 4.2 | 3.8 | 3.1 | 3.6 | 3.4 |
| 3 | 4.1 | 3.8 | 3.4 | 4.0 | 3.2 | 42 | 3.9 | 3.6 | 3.9 | 3.9 |
| 4 | 4.3 | 3.7 | 3.8 | 4.3 | 3.2 | 4.4 | 4.0 | 3.9 | 4.0 | 4.0 |
| 5 | 4.2 | 3.5 | 3.8 | 4.6 | 3.5 | 4.5 | 4.0 | 3.9 | 4.2 | 4.1 |
| 6 | 4.2 | 3.3 | 3.6 | 4.5 | 3.4 | 4.6 | 3.8 | 3.7 | 4.2 | 3.7 |
| 7 | 4.1 | 3.2 | 3.5 | 4.4 | 3.2 | 4.4 | 3.6 | 3.6 | 4.1 | 3.5 |
| 8 | 3.9 | 3.1 | 3.2 | 4.1 | 2.9 | 4.2 | 3.5 | 3.3 | 4.0 | 3.1 |
| 9 | 3.6 | 2.9 | 2.7 | 3.6 | 2.5 | 3.7 | 3.0 | 2.9 | 3.8 | 2.9 |
| 10 | 3.2 | 2.7 | 2.3 | 3.5 | 2.2 | 3.3 | 2.8 | 2.2 | 3.6 | 2.5 |
| 11 | 3.7 | 3.9 | 2.6 | 1.1 | 2.3 | 4.0 | 3.7 | 2.5 | 2.1 | 2.2 |
| 12 | 2.3 | 1.8 | 2.3 | 2.0 | 1.9 | 2.4 | 1.8 | 1.8 | 2.4 | 1.4 |
| 13 | 2.6 | 2.4 | 2.2 | 1.7 | 1.6 | 2.8 | 2.2 | 1.9 | 2.3 | 1.5 |
| 14 | 2.1 | 1.6 | 1.9 | 1.8 | 1.6 | 2.2 | 1.7 | 1.4 | 2.4 | 1.3 |

From Table 3 above, it is clear that the butter rolls of the present invention in which waxy wheat flour was used together with hard wheat flour have volumes larger than those of the butter rolls prepared from any combination of hard wheat flour and waxy cornstarch, waxy rice flour, or tapioca starch, and larger than those of the butter rolls prepared from 100% non-waxy hard wheat flour. Moreover, the butter rolls of the present invention provide excellent texture with the characteristic flavor intrinsic to butter rolls not being impeded. In addition, they provide excellent flavor and texture when stored at room temperature or in refrigerators for a prolonged period, or when heated and thawed in a microwave oven following storage in a frozen state.

Example 2

The below-listed materials were used to prepare hard rolls in accordance with the process described below. The proportions by weight of waxy wheat flour and other flour are shown in Table 1.

Materials:

|  | Sponge | Dough |
| --- | --- | --- |
| Normal flour other than the below-described waxy wheat flour | X g | 3X/7 g |
| Waxy wheat flour (Same as Ex. 1) | (700 − X) g | (300−3X/7) g |
| Yeast | 25 g | — |
| Salt | — | 18 g |
| Isomerized sugar | — | 59 g |
| Shortening oil | — | 30 g |
| Yeast food | 1.5 g | — |
| Water | 400 g | 200 g |

Process for Preparing Hard Rolls

Sponge Making (1) Mixing: The above-listed ingredients for sponge were put in a mixer and mixed for 2 minutes at a low speed and then for 5 minutes at a high speed (Mixing temperature: 24° C.).

(2) Fermentation: Four (4) hours (Temperature: 27° C., Humidity: 70%)

Dough Making (1) The sponge was mixed with the ingredients of dough, and the mixture was mixed with a mixer for 2 minutes at a low speed and then for 5 minutes at a high speed.

(2) Floor time: Twenty (20) minutes (Room temperature)

(3) Cutting: 60 g/piece (4) Bench time: Fifteen (15) minutes (Room temperature)

(5) Forming: Formed into a bar-like shape by use of a molder.

(6) Proofer: Sixty (60) minutes (Temperature: 42° C., Humidity: 85%)

(7) Baking: Nine (9) minutes (Temperature: 210° C.)

The thus-prepared hard rolls were evaluated by 10 panelists in terms of their flavor and texture in accordance with the evaluation standards shown in Table 2 above.

The evaluation regarding flavor and texture was made on hard rolls that had been left to cool at room temperature for 1 hour after being baked, hard rolls that had been stored for 24 hours at room temperature after standing at room temperature for 1 hour, and hard rolls that had been stored for 24 hours in a refrigerator of 4° C.

Moreover, freshly baked hard rolls were placed in a deep freezer (interior temperature: −40° C.), and frozen for 20 minutes to thereby prepare frozen hard rolls. The frozen hard rolls were stored in a −18° C. freezer for 10 days, and thereafter, the hard rolls were heated and thawed in a microwave oven for 30 seconds. The flavor and texture of the hard rolls that had thus been heated and thawed were evaluated in a manner similar to that described above.

The results are shown in Table 4.

TABLE 4

| | | Freshly made | | | | | after storage at room temperature | | | | |
| --- | --- | --- | --- | --- | --- | --- | --- | --- | --- | --- | --- |
| | | | | Texture | | | | | Texture | | |
| Test No. | Volume (C.C) | Flavor Taste | Smell | Touch to the teeth | Hardness | Melt-away | Flavor Taste | Smell | Touch to the teeth | Hardness | Melt-away |
| 1 | 310 | 4.5 | 4.3 | 4.5 | 4.3 | 4.2 | 4.1 | 4.1 | 3.5 | 3.1 | 3.2 |
| 2 | 320 | 4.5 | 4.3 | 4.4 | 4.4 | 4.2 | 4.1 | 4.1 | 3.5 | 4.0 | 3.4 |
| 3 | 360 | 4.5 | 4.3 | 4.3 | 4.5 | 4.2 | 4.1 | 4.0 | 3.6 | 4.2 | 3.4 |
| 4 | 360 | 4.4 | 4.3 | 4.3 | 4.7 | 4.1 | 4.1 | 4.0 | 3.6 | 4.4 | 3.5 |
| 5 | 370 | 4.4 | 4.2 | 4.2 | 4.7 | 4.1 | 4.1 | 4.0 | &5 | 4.5 | 3.5 |
| 6 | 380 | 4.3 | 4.2 | 4.0 | 4.6 | 3.9 | 4.0 | 3.8 | 3.5 | 4.5 | 3.5 |
| 7 | 380 | 4.3 | 4.1 | 3.9 | 4.4 | 3.7 | 3.9 | 3.8 | 3.5 | 4.2 | 3.4 |
| 8 | 360 | 3.9 | 3.7 | 3.7 | 4.3 | 3.5 | 3.8 | 3.4 | 3.4 | 4.1 | 3.3 |
| 9 | 345 | 3.4 | 3.3 | 3.4 | 4.0 | 2.9 | 3.3 | 3.2 | 3.1 | 3.8 | 2.7 |
| 10 | 300 | 3.2 | 2.8 | 2.9 | 3.7 | 2.7 | 3.1 | 2.7 | 2.8 | 3.6 | 2.5 |
| 11 | 300 | 4.5 | 4.3 | 4.5 | 4.3 | 4.2 | 4.1 | 3.9 | 3.5 | 2.8 | 3.1 |
| 12 | 280 | 2.8 | 2.3 | 3.0 | 2.8 | 2.7 | 2.5 | 2.0 | 2.7 | 2.7 | 2.1 |
| 13 | 270 | 3.1 | 2.7 | 3.1 | 2.8 | 2.5 | 2.7 | 2.4 | 2.8 | 2.6 | 2.0 |
| 14 | 270 | 2.7 | 2.0 | 2.4 | 2.4 | 2.3 | 2.4 | 2.0 | 2.3 | 2.1 | 2.1 |

TABLE 4-continued

| | | | after storage in a refrigerator | | | | Heated and thawed after storage in a freezer | | | |
|---|---|---|---|---|---|---|---|---|---|---|
| | | | | Texture | | | | Texture | | |
| Test No. | Flavor | | Touch to the teeth | Hard-ness | Melt-away | Flavor | | Touch to the teeth | Hard-ness | Melt-away |
| | Taste | Smell | | | | Taste | Smell | | | |
| 1 | 3.5 | 3.7 | 2.9 | 2.0 | 2.4 | 3.8 | 3.9 | 2.8 | 2.4 | 2 |
| 2 | 3.7 | 3.7 | 2.9 | 3.6 | 2.9 | 3.8 | 3.9 | 3.1 | 3.5 | 3 |
| 3 | 3.9 | 3.6 | 3.1 | 3.9 | 3.1 | 3.9 | 4.0 | 3.5 | 3.8 | 3 |
| 4 | 4.1 | 3.6 | 3.4 | 4.2 | 3.2 | 4.1 | 4.0 | 4.0 | 4.1 | 3 |
| 5 | 4.2 | 3.5 | 3.5 | 4.4 | 3.4 | 1.2 | 4.0 | 4.0 | 4.2 | 4 |
| 6 | 4.1 | 3.4 | 3.6 | 4.4 | 3.6 | 4.1 | 3.8 | 3.8 | 4.3 | 3 |
| 7 | 3.9 | 3.3 | 3.5 | 4.2 | 3.4 | 3.9 | 3.8 | 3.7 | 4.3 | 3 |
| 8 | 3.7 | 3.3 | 3.4 | 4.1 | &0 | 3.7 | 3.5 | 3.6 | 4.2 | 3 |
| 9 | 3.1 | 2.8 | 3.0 | 3.6 | 2.4 | 3.I | 3.0 | 3.2 | 3.8 | 2 |
| 10 | 2.9 | 2.6 | 2.5 | 3.4 | 2.2 | 2.9 | 2.7 | 2.7 | 3.5 | 2 |
| 11 | 3.5 | 3.7 | 2.8 | 1.6 | 2.2 | 3.8 | 3.9 | 2.6 | 1.8 | 2 |
| 12 | 2.1 | 1.7 | 2.4 | 2.3 | 1.7 | 2.1 | 1.7 | 2.0 | 2.6 | 1 |
| 13 | 2.2 | 2.0 | 2.5 | 2.8 | 1.6 | 2.0 | 1.9 | 2.1 | 2.6 | 1.3 |
| 14 | 1.9 | 1.9 | 1.9 | 1.9 | 1.6 | 1.9 | 1.5 | 1.6 | 2.3 | 1 |

From Table 4 above, it is clear that the hard rolls of the present invention in which waxy wheat flour was used together with hard wheat flour have volumes larger than those of the hard rolls prepared from any combination of hard wheat flour and waxy cornstarch, waxy rice flour, or tapioca starch, and larger than those of the hard rolls prepared from 100% ordinary hard wheat flour. Moreover, the hard rolls of the present invention provide excellent texture with the characteristic flavor intrinsic to hard rolls not being impeded. In addition, they provide excellent flavor and texture when stored at room temperature or in refrigerators for a prolonged period, or when heated and thawed in a microwave oven following storage in a frozen state.

Example 3

The below-listed materials were used to prepare yeast doughnuts in accordance with the process described below. The proportions by weight of waxy wheat flour and other flour are shown in Table 1.

| Materials: | |
|---|---|
| Normal flour other than the below-described waxy wheat flour | X g |
| Waxy wheat flour (Same as Ex. 1) | (1000 − X) g |
| Yeast | 50 g |
| Salt | 15 g |
| Sugar | 120 g |
| Shortening oil | 100 g |
| Egg | 100 g |
| Powdered skim milk | 20 g |
| Baking powder | 10 g |
| Water | 520 g |

Process for Preparing Yeast Doughnuts (1) Mixing: All the above-listed ingredients were put in a mixer and mixed for 2 minutes at a low speed and then for 7 minutes at a high speed (Mixing temperature: 27° C.).

(2) Fermentation: Sixty (60) minutes without punching (Temperature: 27° C., Humidity: 70%)

(3) Cutting: 45 g/piece (4) Forming: The dough was extended into a sheet having a thickness of about 8 mm, from which rings each having an outer diameter of 8 cm were punched out by the use of ring-shaped doughnut cutters.

(5) Proofer: Thirty (30) minutes (Temperature: 35° C., Humidity: 85%)

(7) Deep-frying: Two (2) minutes (Temperature: 180° C.)

The thus-prepared yeast doughnuts were evaluated by 10 panelists in terms of their flavor and texture in accordance with the evaluation standards shown in Table 2 above.

The evaluation regarding flavor and texture was made on yeast doughnuts that had been left to cool at room temperature for 1 hour after being fried, doughnuts that had been stored for 24 hours at room temperature after standing to cool at room temperature for 1 hour, and doughnuts that had been stored for 24 hours in a refrigerator of 4° C.

Moreover, freshly fried yeast doughnuts were placed in a deep freezer (interior temperature: −40° C.), and frozen for 20 minutes to thereby prepare frozen yeast doughnuts. The frozen yeast doughnuts were stored in a −18° C. freezer for 10 days, and thereafter, they were heated and thawed in a microwave oven for 45 seconds. The flavor and texture of the yeast doughnuts that had thus been heated and thawed were evaluated in a manner similar to that described above.

The amounts of oil that had been absorbed during frying are indicated by relative values with respect to the amount of oil absorbed in Test No. 11 which is taken as 1.

The results are shown in Table 5.

TABLE 5

| Test No. | Freshly made | | | | | | after storage at room temperature | | | | | |
|---|---|---|---|---|---|---|---|---|---|---|---|---|
| | Amount of oil absorbed | Flavor | | Texture | | | Flavor | | Texture | | |
| | | Taste | Smell | Touch to the teeth | Hardness | Melt-away | Taste | Smell | Touch to the teeth | Hardness | Melt-away |
| 1 | 1.0 | 4.7 | 4.5 | 4.6 | 4.6 | 4.5 | 4.2 | 4.3 | 3.4 | 3.4 | 3.1 |
| 2 | 1.0 | 4.7 | 4.6 | 4.6 | 4.6 | 4.4 | 4.2 | 4.3 | 3.6 | 3.9 | 3.4 |
| 3 | 0.8 | 4.7 | 4.6 | 4.5 | 4.6 | 4.2 | 4.2 | 4.2 | 3.7 | 4.2 | 3.4 |
| 4 | 0.7 | 4.7 | 4.6 | 4.4 | 4.7 | 4.0 | 4.1 | 4.2 | 3.8 | 4.3 | 3.5 |
| 5 | 0.6 | 4.6 | 4.5 | 4.3 | 4.7 | 4.0 | 4.1 | 4.1 | 3.6 | 4.4 | 3.6 |
| 6 | 0.6 | 4.6 | 4.4 | 4.1 | 4.6 | 3.8 | 1.0 | 4.0 | 3.6 | 4.3 | 3.6 |
| 7 | 0.7 | 4.5 | 4.4 | 4.0 | 4.4 | 3.6 | 4.0 | 4.0 | 3.5 | 4.2 | 3.5 |
| 8 | 0.7 | 4.4 | 4.3 | 3.8 | 4.3 | 3.3 | 3.8 | 3.8 | 3.4 | 4.2 | 3.2 |
| 9 | 0.8 | 3.9 | 4.0 | 3.5 | 3.9 | 2.8 | 3.6 | 3.6 | 3.2 | 3.8 | 2.6 |
| 10 | 0.8 | 3.6 | 3.7 | 3.0 | 3.7 | 2.6 | 3.4 | 3.3 | 2.7 | 3.5 | 2.4 |
| 11 | 1.0 | 4.7 | 4.6 | 4.6 | 4.6 | 4.5 | 4.2 | 4.3 | 3.4 | 3.2 | 3.0 |
| 12 | 0.8 | 3.0 | 3.4 | 3.0 | 2.9 | 2.5 | 2.5 | 2.8 | 2.8 | 2.6 | 2.2 |
| 13 | 0.8 | 3.1 | 3.5 | 3.1 | 3.1 | 2.5 | 2.7 | 2.8 | 29 | 2.7 | 2.1 |
| 14 | 0.8 | 2.8 | 3.0 | 2.7 | 2.7 | 2.2 | 2.4 | 2.6 | 2.6 | 2.5 | 1.9 |

| Test No. | after storage in a refrigerator | | | | | | Heated and thawed after storage in a freezer | | | | |
|---|---|---|---|---|---|---|---|---|---|---|---|
| | Flavor | | Texture | | | Flavor | | Texture | | | |
| | Taste | Smell | Touch to the teeth | Hardness | Melt-away | Taste | Smell | Touch to the teeth | Hardness | Melt-away | |
| 1 | 3.5 | 3.7 | 2.6 | 2.7 | 2.2 | 3.7 | 3.9 | 2.6 | 2.4 | 2.4 | |
| 2 | 3.5 | 3.7 | 2.8 | 3.5 | 2.8 | 3.7 | 3.9 | 3.2 | 3.4 | 3.0 | |
| 3 | 3.7 | 3.6 | 3.0 | 3.7 | 3.0 | 39 | 4.0 | 3.4 | 3.7 | 3.6 | |
| 4 | 3.8 | 3.5 | 3.3 | 4.0 | 3.2 | 4.0 | 4.0 | 3.9 | 4.2 | 3.8 | |
| 5 | 4.0 | 3.5 | 3.4 | 4.1 | 3.4 | 4.1 | 4.1 | 10 | 4.2 | 3.9 | |
| 6 | 4.1 | 3.4 | 3.5 | 4.1 | 3.5 | 4.1 | 4.0 | 4.0 | 4.3 | 3.7 | |
| 7 | 4.0 | 3.3 | 3.5 | 4.0 | 3.4 | 3.9 | 3.8 | 3.8 | 4.3 | 3.5 | |
| 8 | 3.6 | 3.2 | 3.3 | 3.9 | 3.0 | 3.6 | 3.6 | 3.6 | 4.1 | 3.2 | |
| 9 | 3.3 | 2.8 | 3.1 | 3.6 | 2.5 | 3.1 | 3.2 | 3.2 | 3.7 | 2.6 | |
| 10 | 3.0 | 2.5 | 2.5 | 3.3 | 2.2 | 2.8 | 2.9 | 2.6 | 3.4 | 2.2 | |
| 11 | 3.5 | 3.7 | 2.6 | 2.1 | 2.1 | 3.7 | 3.9 | 2.4 | 1.9 | 2.2 | |
| 12 | 2.3 | 1.8 | 2.4 | 2.2 | 1.8 | 1.9 | 1.8 | 1.9 | 2.7 | 1.4 | |
| 13 | 2.5 | 1.8 | 2.5 | 2.2 | 1;9 | 2.1 | 1.9 | 2.1 | 2.8 | 1.5 | |
| 14 | 1.9 | 1.6 | 2.2 | 2.0 | 1.6 | 1.9 | 1.6 | 1.9 | 2.7 | 1.4 | |

From Table 5 above, it is clear that the yeast doughnuts of the present invention in which waxy wheat flour was used together with hard wheat flour absorb less oil than was absorbed by the yeast doughnuts prepared from any combination of hard wheat flour and waxy cornstarch, waxy rice flour, or tapioca starch, and less oil than was absorbed by the yeast doughnuts prepared from 100% ordinary hard wheat flour. Moreover, the yeast doughnuts of the present invention provide excellent texture with the characteristic flavor intrinsic to yeast doughnuts not being impeded. In addition, they provide excellent flavor and texture when stored at room temperature or in refrigerators for a prolonged period, or when heated and thawed in a microwave oven following storage in a frozen state.

Example 4

The below-listed materials were used to prepare a pizza crust in accordance with the process described below. The proportions by weight of waxy wheat flour and other flour are shown in Table 1.

| Materials: | |
|---|---|
| Normal flour other than the below-described waxy wheat flour | X g |
| Waxy wheat flour (Same as Ex. 1) | (100 − X) g |
| Yeast | 3 g |
| Yeast food | 0.1 g |
| Salt | 1 g |
| Sugar | 3 g |
| Shortening oil | 3 g |
| Water | 66 g |

Process for Preparing a Pizza Crust (1) Mixing: All the above-listed ingredients were put in a mixer and mixed for 5 minutes at a low speed and then for 5 minutes at a high speed (Mixing temperature: 26° C.).

(2) Fermentation: Forty (40) minutes (Temperature: 27° C., Humidity: 70%)

(3) Cutting: 45 g/piece (4) Bench time: 15 minutes (Room temperature)

(5) Forming: Formed into a round sheet having a diameter of 8 cm by the use of a molder having a spacing of 3.5 mm (6) Proofer: Twenty five (25) minutes (Temperature: 38° C., Humidity: 80%)

that had thus been heated and thawed were evaluated in a manner similar to that described above.

The results are shown in Table 6.

TABLE 6

| Test No. | Freshly made | | | | | after storage at room temperature | | | | |
|---|---|---|---|---|---|---|---|---|---|---|
| | Flavor | | Texture | | | Flavor | | Texture | | |
| | Taste | Smell | Touch to the teeth | Hardness | Melt-away | Taste | Smell | Touch to the teeth | Hardness | Melt-away |
| 1 | 4.5 | 4.4 | 4.6 | 4.7 | 4.2 | 4.0 | 4.0 | 3.3 | 2.9 | 3.0 |
| 2 | 4.5 | 4.4 | 4.6 | 4.6 | 4.2 | 4.0 | 4.0 | 3.4 | 4.2 | 3.2 |
| 3 | 4.5 | 4.4 | 4.5 | 4.7 | 4.2 | 4.0 | 4.0 | 3.5 | 4.4 | 3.3 |
| 4 | 4.4 | 4.3 | 4.3 | 4.7 | 4.2 | 4.0 | 4.0 | 3.5 | 4.5 | 3.4 |
| 5 | 4.4 | 4.3 | 4.2 | 4.8 | 4.1 | 4.0 | 3.9 | 3.5 | 4.6 | 3.5 |
| 6 | 4.3 | 4.1 | 4.0 | 4.7 | 4.0 | 4.0 | 3.8 | 3.5 | 4.5 | 3.5 |
| 7 | 4.2 | 4.0 | 3.9 | 4.7 | 3.8 | 3.9 | 3.8 | 3.5 | 4.5 | 3.5 |
| 8 | 3.9 | 3.8 | 3.6 | 4.6 | 3.6 | 3.9 | 3.6 | 3.3 | 1.4 | 3.2 |
| 9 | 3.7 | 3.6 | 3.3 | 4.4 | 3.0 | 3.5 | 3.3 | 3.1 | 4.2 | 2.7 |
| 10 | 3.5 | 3.4 | 2.8 | 3.9 | 2.7 | 3.4 | 2.8 | 2.7 | 3.7 | 2.5 |
| 11 | 4.5 | 4.4 | 4.6 | 4.6 | 4.2 | 4.0 | 4.0 | 3.3 | 2.5 | 3.0 |
| 12 | 2.7 | 2.3 | 2.6 | 2.9 | 2.6 | 2.5 | 2.2 | 2.4 | 2.9 | 2.2 |
| 13 | 3.0 | 2.4 | 2.7 | 2.9 | 2.5 | 2.7 | 2.1 | 2.4 | 2.8 | 2.2 |
| 14 | 2.7 | 2.2 | 2.5 | 2.8 | 2.4 | 2.5 | 2.0 | 2.4 | 2.7 | 2.1 |

| Test No. | after storage in a refrigerator | | | | | Heated and thawed after storage in a freezer | | | | |
|---|---|---|---|---|---|---|---|---|---|---|
| | Flavor | | Texture | | | Flavor | | Texture | | |
| | Taste | Smell | Touch to the teeth | Hardness | Melt-away | Taste | Smell | Touch to the teeth | Hardness | Melt-away |
| 1 | 3.6 | 3.7 | 2.7 | 2.4 | 2.2 | 4.0 | 3.8 | 2.7 | 2.4 | 2.6 |
| 2 | 3.7 | 3.7 | 3.0 | 3.5 | 2.8 | 4.0 | 3.8 | 3.2 | 3.3 | 3.3 |
| 3 | 3.8 | 3.7 | 3.2 | 3.7 | 3.0 | 4.0 | 3.9 | 3.5 | 3.7 | 3.6 |
| 4 | 4.0 | 3.6 | 3.4 | 4.0 | 3.2 | 4.1 | 3.9 | 3.9 | 4.0 | 3.9 |
| 5 | 4.0 | 3.6 | 3.5 | 4.2 | 3.4 | 4.2 | 4.0 | 4.0 | 4.2 | 3.9 |
| 6 | 4.1 | 3.6 | 3.5 | 4.3 | 3.5 | 4.2 | 3.9 | 3.8 | 4.2 | 3.7 |
| 7 | 3.9 | 3.5 | 3.5 | 4.3 | 3.3 | 4.0 | 3.8 | 3.7 | 4.3 | 3.5 |
| 8 | 3.7 | 3.4 | 3.3 | 4.2 | 3.1 | 3.7 | 3.6 | 3.5 | 4.1 | 3.1 |
| 9 | 3.3 | 2.9 | 3.0 | 3.9 | 2.6 | 3.3 | 3.2 | 3.1 | 3.7 | 2.7 |
| 10 | 3.0 | 2.7 | 2.6 | 3.5 | 2.3 | 2.9 | 2.7 | 2.5 | 3.5 | 2.3 |
| 11 | 3.6 | 3.7 | 2.6 | 1.4 | 2.0 | 3.9 | 3.8 | 2.7 | 1.6 | 2.3 |
| 12 | 2.3 | 2.0 | 2.2 | 2.7 | 1.9 | 2.1 | 1.9 | .2.0 | 2.5 | 1.4 |
| 13 | 2.2 | 2.0 | 2.2 | 2.4 | 1.9 | 2.0 | 1.9 | 2.1 | 2.4 | 1.3 |
| 14 | 2.2 | 1.9 | 1.9 | 2.5 | 1.8 | 2;0 | 1.9 | 1.9 | 2.3 | 1.4 |

(7) Baking: Eight (8) minutes (Temperature: 220° C.)

Five (5) g of pizza sauce was applied to each of the thus-prepared pizza crusts, and each pizza crust was topped with 5 g of sliced ham and 10 g of cheese, to thereby make a pizza product. The products were evaluated by 10 panelists in terms of their flavor and texture in accordance with the evaluation standards shown in Table 2 above.

The evaluation regarding flavor and texture was made on pizza crusts that had been left to cool at room temperature for 1 hour after being made, pizza crusts that had been stored for 24 hours at room temperature after standing at room temperature for 1 hour, and pizza crusts that had been stored for 24 hours in a refrigerator of 4° C.

Moreover, freshly baked pizza crusts were placed in a deep freezer (interior temperature: −40° C.), and frozen for 20 minutes to thereby prepare frozen pizza crusts. The frozen crusts were stored in a −18° C. freezer for 10 days, and thereafter, they were heated and thawed in a microwave oven for 2 minutes. The flavor and texture of the pizza crusts From Table 6 above, it is clear that the pizza crusts of the present invention in which waxy wheat flour was used together with hard wheat flour provide excellent texture superior to the pizza crusts prepared from any combination of hard wheat flour and waxy cornstarch, waxy rice flour, or tapioca starch, and to the pizza crusts prepared from 100% normal hard wheat flour. Moreover, the pizza crusts of the present invention provide excellent texture with the characteristic flavor intrinsic to pizza crusts not being impeded. In addition, they provide excellent flavor and texture when stored at room temperature or in refrigerators for a prolonged period, or when heated and thawed in a microwave oven following storage in a frozen state.

Example 5

The below-listed materials were used to prepare a sponge cake in accordance with the process described below. The proportions by weight of waxy wheat flour and other flour are shown in Table 7.

| Materials: | |
|---|---|
| Normal flour other than the below-described waxy wheat flour | X g |
| Waxy wheat flour (obtained in Ex. 2 of JP-A-6-125669) | (100 − X) g |
| Sugar | 100 g |
| Whole egg | 100 g |
| Water | 40 g |

Process for Preparing a Sponge Cake (1) Mixing: Stirred whole egg liquid is mixed with sugar in a warm bath. The mixture is foamed by repeated whippings at a high speed (295 revolutions/min) and a medium speed (190 revolutions/min), to thereby obtain a uniform batter. 30° C. water is gradually added thereto. Shifted wheat flour is added and the resultant mixture was mixed with a spatula.

(2) Baking: The batter (320 g) is placed in a cake pan baked at 190° C. for 30 minutes.

TABLE 7

| Test No. | Waxy wheat flour (%) | Hard wheat flour* (%) | Waxy cornstarch (%) | Waxy rice flour (%) | Tapioca starch (%) |
|---|---|---|---|---|---|
| 1 | 0.5 | 99.5 | — | — | — |
| 2 | 1 | 99 | — | — | — |
| 3 | 2 | 98 | — | — | — |
| 4 | 5 | 95 | — | — | — |
| 5 | 10 | 90 | — | — | — |
| 6 | 20 | 80 | — | — | — |
| 7 | 30 | 70 | — | — | — |
| 8 | 40 | 60 | — | — | — |
| 9 | 50 | 50 | — | — | — |
| 10 | 0 | 100 | — | — | — |
| 11 | — | 85 | 15 | — | — |
| 12 | — | 85 | — | 15 | — |
| 13 | — | 85 | — | — | 15 |

*Milled from 100% Western White wheat produced in the U.S.

The thus-prepared sponge cake was evaluated by 10 panelists in terms of its flavor and texture in accordance with the evaluation standards shown in Table 8 below, and average ratings were obtained.

The evaluation regarding flavor and texture was made on a sponge cake that had been left to cool at room temperature and also on a sponge cake that had been stored for 24 hours in a 4° C. refrigerator after standing at room temperature until cooled.

Moreover, a freshly baked sponge cake was placed in a deep freezer (interior temperature: −40° C.), and frozen for 20 minutes to thereby prepare a frozen sponge cake. The frozen sponge cake was stored in a −18° C. freezer for 10 days, and thereafter, it was heated and thawed in a microwave oven. The flavor and texture of the sponge cake that had thus been heated and thawed were evaluated in a manner similar to that described above.

The results are shown in Table 9.

TABLE 8

| Flavor | | |
|---|---|---|
| Taste | 5 | Excellent taste with rich flavor |
| | 4 | Fair taste and flavor |
| | 3 | Moderate taste and flavor |
| | 2 | Very slight taste and flavor |
| | 1 | No taste and no flavor |
| Smell | 5 | Strong sweet smell |
| | 4 | Relatively strong sweet smell |
| | 3 | Hint of sweet smell with acidic odor |
| | 2 | Very slight sweet smell with strong acidic odor |
| | 1 | Bad smell and disagreeable |
| Texture | | |
| Touch to the teeth | 5 | Crispy and very smoothly cut by the teeth |
| | 4 | Slightly crispy and relatively smoothly cut by the teeth |
| | 3 | Relatively sticky and relatively poorly cut by the teeth |
| | 2 | Relatively lumpy and somewhat poorly cut by the teeth |
| | 1 | Lumpy and somewhat poorly cut by the teeth |
| Hardness | 5 | Crumbly and light texture, soft feel to the mouth |
| | 4 | Relatively crumbly and slightly light texture, soft feel to the mouth |
| | 3 | Relatively soft but somewhat excessively elastic |
| | 2 | Slightly hard and very elastic |
| | 1 | Hard and rough feel to the mouth |
| Meltaway characteristics | 5 | Smoothly melt in the mouth, distinctive meltaway characteristics |
| | 4 | Good meltaway characteristics |
| | 3 | Fair meltaway characteristics |
| | 2 | Slightly poor meltaway characteristics |
| | 1 | Poor meltaway characteristics with lumps being formed |

TABLE 9

| | | Freshly made | | | | | After storage in a refrigerator | | | | | Heated and thawed after storage in a freezer | | | | |
|---|---|---|---|---|---|---|---|---|---|---|---|---|---|---|---|---|
| | | Flavor | | Texture | | | Flavor | | Texture | | | Flavor | | Texture | | |
| Test No. | Volume (C.C) | Taste | Smell | Touch to the teeth | Hard-ness | Melt-away | Taste | Smell | Touch to the teeth | Hard-ness | Melt-away | Taste | Smell | Touch to the teeth | Hard-ness | Melt-away |
| 1 | 1390 | 4.5 | 4.6 | 4.5 | 4.6 | 4.5 | 3.7 | 3.9 | 2.4 | 2.5 | 2.8 | 4.0 | 3.8 | 3.2 | 3.4 | 3.5 |
| 2 | 1420 | 4.5 | 4.6 | 4.5 | 4.6 | 4.6 | 4.1 | 3.8 | 3.5 | 4.1 | 3.2 | 4.2 | 3.9 | 37 | 3.9 | 3.8 |
| 3 | 1450 | 4.5 | 4.6 | 4.7 | 4.6 | 4.6 | 4.2 | 3.8 | 3.8 | 4.3 | 3.5 | 4.2 | 4.0 | 4.0 | 4.2 | 3.9 |
| 4 | 1460 | 4.6 | 4.6 | 4.7 | 4.7 | 4.6 | 4.2 | 3.7 | 4.0 | 4.6 | 3.9 | 4.3 | 4.1 | 4.1 | 4.3 | 4.0 |
| 5 | 1410 | 4.5 | 4.5 | 4.5 | 4.5 | 4.5 | 4.2 | 3.5 | 3.8 | 4.4 | 3.4 | 4.3 | 3.9 | 3.8 | 4.2 | 3.8 |
| 6 | 1390 | 4.4 | 4.5 | 4.3 | 4.5 | 4.4 | 4.1 | 3.4 | 3.6 | 4.3 | 3.2 | 4.1 | 3.7 | 3.6 | 4.1 | 3.6 |

TABLE 9-continued

| | | | | Freshly made | | | | After storage in a refrigerator | | | | Heated and thawed after storage in a freezer | | | |
|---|---|---|---|---|---|---|---|---|---|---|---|---|---|---|---|
| | | | | | Texture | | | | | Texture | | | | Texture | |
| Test No. | Volume (C.C) | Flavor | | Touch to the teeth | Hard-ness | Melt-away | Flavor | | Touch to the teeth | Hard-ness | Melt-away | Flavor | | Touch to the teeth | Hard-ness | Melt-away |
| | | Taste | Smell | | | | Taste | Smell | | | | Taste | Smell | | | |
| 7 | 1300 | 4.3 | 4.3 | 4.0 | 4.4 | 4.0 | 4.0 | 3.2 | 3.3 | 4.2 | 3.0 | 3.9 | 3.5 | 3.4 | 4.0 | 3.3 |
| 8 | 1170 | 3.7 | 3.8 | 3.3 | 3.5 | 3.2 | 3.5 | 2.5 | 2.6 | 3.5 | 2.4 | 3.4 | 3.0 | 2.4 | 3.5 | 2.6 |
| 9 | 1070 | 3.1 | 3.2 | 2.9 | 3.1 | 2.8 | 3.1 | 2.2 | 2.1 | 3.1 | 2.2 | 3.2 | 2.6 | 2.1 | 3.3 | 2.1 |
| 10 | 1390 | 4.5 | 4.6 | 4.5 | 4.6 | 4.5 | 3.8 | 3.9 | 2.4 | 1.8 | 2.4 | 4.0 | 3.8 | 2.6 | 2.0 | 2.3 |
| 11 | 1170 | 3.2 | 3.0 | 3.0 | 2.7 | 2.8 | 2.3 | 1.8 | 2.2 | 2.5 | 1.9 | 2.4 | 1.8 | 2.0 | 2.5 | 1.9 |
| 12 | 1200 | 3.1 | 3.0 | 2.9 | 2.5 | 2.5 | 2.4 | 1.9 | 2.2 | 2.7 | 2.1 | 2.6 | 2.2 | 1.9 | 2.3 | 1.7 |
| 13 | 1190 | 2.9 | 2.9 | 2.7 | 2.5 | 2.6 | 2.1 | 1.6 | 2.0 | 2.9 | 1.6 | 2.2 | 1.8 | 2.0 | 2.3 | 1.5 |

From Table 9 above, it is clear that the sponge cakes of the present invention in which waxy wheat flour was used together with soft wheat flour has volumes larger than those of sponge cakes prepared from any combination of soft wheat flour and waxy cornstarch, waxy rice flour, or tapioca starch, and larger than those of the sponge cake prepared from 100% normal soft wheat flour. Moreover, the sponge cakes of the present invention provide excellent texture with the characteristic flavor intrinsic to sponge cake not being impeded. In addition, they provide excellent flavor and texture when stored in refrigerators or when heated and thawed in a microwave oven following storage in a frozen state.

Example 6

The below-listed materials were used to prepare a butter cake in accordance with the process described below. The proportions by weight of waxy wheat flour and other flour are shown in Table 7.

| Materials: | |
|---|---|
| Normal flour other than the below-described waxy wheat flour | X g |
| Waxy wheat flour (Same as Ex. 5) | (100 − X) g |
| Margarine | 90 g |
| Salt | 0.5 g |
| Sugar | 90 g |
| Whole egg | 90 g |
| Milk | 5 g |
| Brandy | 3 g |
| Rum | 2 g |
| Baking powder | 1.5 g |

Process for Preparing a Butter Cake (1) Mixing: Salt is added to margarine, and the salted margarine is mixed with a mixer for 1.5 minutes at a low speed (98 revolutions/min) and then for 1 minute at a high speed (295 revolutions/min), to thereby obtain a creamy mixture. Sugar is added thereto and mixed for 5 minutes at a high speed. Whole egg liquid is gradually added in 5–6 divided portions. The resultant mixture is mixed for 7 minutes at a low speed and then 4 minutes at a high speed. Brandy and rum are added, and then wheat flour and baking powder are added, followed by mixing for 2 minutes at a low speed.

(2) Baking: The batter (350 g) is placed in a pound cake case and baked at 180° C. for 25 minutes.

The thus-prepared butter cake was evaluated by 10 panelists in terms of its flavor and texture in accordance with the evaluation standards shown in Table 8 above.

The evaluation regarding flavor and texture was made on a butter cake that had been left to cool at room temperature, and also on a butter cake that had been stored for 24 hours in a 4° C. refrigerator after standing at room temperature until cooled.

Moreover, a freshly baked butter cake was placed in a deep freezer (interior temperature: −40° C.), and frozen for 20 minutes to thereby prepare a frozen butter cake. The frozen butter cake was stored in a −18° C. freezer for 10 days, and thereafter, it was heated and thawed in a refrigerator (4° C.). The flavor and texture of the butter cake that had thus been thawed were evaluated in a manner similar to that described above.

The results are shown in Table 10.

TABLE 10

| | Freshly made | | | | | After storage in a refrigerator | | | | | Heated and thawed after storage in a freezer | | | | |
|---|---|---|---|---|---|---|---|---|---|---|---|---|---|---|---|
| | | | Texture | | | | | Texture | | | | | Texture | | |
| Test | Flavor | | Touch to the teeth | Hard-ness | Melt-away | Flavor | | Touch to the teeth | Hard-ness | Melt-away | Flavor | | Touch to the teeth | Hard-ness | Melt-away |
| No. | Taste | Smell | | | | Taste | Smell | | | | Taste | Smell | | | |
| 1 | 4.6 | 4.5 | 4.3 | 4.6 | 4.6 | 4.3 | 4.3 | 3.9 | 4.9 | 4.2 | 4.0 | 4.0 | 3.2 | 3.7 | 4.3 |
| 2 | 4.6 | 4.5 | 4.3 | 4.6 | 4.6 | 4.3 | 4.3 | 4.0 | 4.1 | 4.3 | 42 | 4.0 | 3.8 | 4.1 | 4.5 |

TABLE 10-continued

|  | Freshly made | | | | | After storage in a refrigerator | | | | | Heated and thawed after storage in a freezer | | | | |
| --- | --- | --- | --- | --- | --- | --- | --- | --- | --- | --- | --- | --- | --- | --- | --- |
|  | Flavor | | Texture | | | Flavor | | Texture | | | Flavor | | Texture | | |
|  |  |  | Touch to the | Hard- | Melt- |  |  | Touch to the | Hard- | Melt- |  |  | Touch to the | Hard- | Melt- |
| Test No. | Taste | Smell | teeth | ness | away | Taste | Smell | teeth | ness | away | Taste | Smell | teeth | ness | away |
| 3 | 4.6 | 4.5 | 4.2 | 4.5 | 4.6 | 4.3 | 4.2 | 4.0 | 4.2 | 4.3 | 4.2 | 4.0 | 4.0 | 4.4 | 4.5 |
| 4 | 4.6 | 4.4 | 4.2 | 4.5 | 4.6 | 4.2 | 4.2 | 4.0 | 4.5 | 4.2 | 4.3 | 4.1 | 4.1 | 4.4 | 4.5 |
| 5 | 4.5 | 4.1 | 4.1 | 4.5 | 4.5 | 4.2 | 4.2 | 4.0 | 4.4 | 4.2 | 4.2 | 4.0 | 4.0 | 4.4 | 4.3 |
| 6 | 4.4 | 4.5 | 4.0 | 4.5 | 4.4 | 4.1 | 4.0 | 3.9 | 4.4 | 4.0 | 4.0 | 3.8 | 3.7 | 4.4 | 4.2 |
| 7 | 4.2 | 4.3 | 3.9 | 4.2 | 4.1 | 4.0 | 4.0 | 3.7 | 4.1 | 3.8 | 3.9 | 3.5 | 3.5 | 4.0 | 3.9 |
| 8 | 3.6 | 3.7 | 3.3 | 3.4 | 3.1 | 3.4 | 3.4 | 2.8 | 3.2 | 2.4 | 3.3 | 2.9 | 2.3 | 3.2 | 2.8 |
| 9 | 3.1 | 3.2 | 2.8 | 3.0 | 2.6 | 3.0 | 2.8 | 2.5 | 2.9 | 2.0 | 3.0 | 2.4 | 2.0 | 2.9 | 2.0 |
| 10 | 4.6 | 4.5 | 4.3 | 4.6 | 4.6 | 4.2 | 4.3 | 3.8 | 4.0 | 4.3 | 4.0 | 4.1 | 1.1 | 3.6 | 4.4 |
| 11 | 2.7 | 2.8 | 2.9 | 3.4 | 2.5 | 2.5 | 2.7 | 2.2 | 3.0 | 2.4 | 2.3 | 2.2 | 2.0 | 2.9 | 2.2 |
| 12 | 2.8 | 2.9 | 2.9 | 3.5 | 2.2 | 2.6 | 2.8 | 2.4 | 3.1 | 2.2 | 2.4 | 2.4 | 2.2 | 3.1 | 2.4 |
| 13 | 2.5 | 2.5 | 2.8 | 3.1 | 2.7 | 2.3 | 2.4 | 2.1 | 2.9 | 2.0 | 2.0 | 2.0 | 2.0 | 3.3 | 2.0 |

From Table 10 above, it is clear that the butter cakes of the present invention in which waxy wheat flour was used together with soft wheat flour provide excellent texture with the characteristic flavor intrinsic to butter cake not being impeded, as compared to butter cakes prepared from any combination of soft wheat flour and waxy cornstarch, waxy rice flour, or tapioca starch, and to the butter cake prepared from 100% normal soft wheat flour. Moreover, the butter cakes of the present invention provide excellent flavor and texture when stored in refrigerators, or when thawed in a refrigerator following storage in a frozen state.

Example 7

The below-listed materials were used to prepare a pancake in accordance with the process described below. The proportions by weight of waxy wheat flour and other flour are shown in Table 7.

| Materials: | |
| --- | --- |
| Normal flour other than the below-described waxy wheat flour | X g |
| Waxy wheat flour (Same as Ex. 5) | (1000 − X) g |
| Sugar | 350 g |
| Butter | 50 g |
| Whole egg | 700 g |
| Milk | 60 g |
| Baking powder | 30 g |

Process for Preparing a Pancake (1) Mixing: Of the above-listed ingredients, sugar and whole egg are mixed. To the resultant mixture are added milk and melt butter. Separetely, a shifted mixture of wheat flour and baking powder is combined with the former mixture and mixed so as to obtain a cake batter.

(2) Baking: The cake batter was poured onto a 180° C. iron plate to which oil has been applied. The batter was baked for 1 minute and 10 seconds on one side, and then for 45 seonds on the other side.

The thus-prepared pancake was evaluated by 10 panelists in terms of its flavor and texture in accordance with the evaluation standards shown in Table 8 above.

The evaluation regarding flavor and texture was made on a pancake that had been left to cool at room temperature, and also on a pancake that had been stored for 24 hours in a 4° C. refrigerator after standing at room temperature until cooled.

Moreover, a freshly baked pancake was placed in a deep freezer (interior temperature: −40° C.), and frozen for 20 minutes to thereby prepare a frozen pancake. The frozen pan cake was stored in a −18° C. freezer for 10 days, and thereafter, it was heated and thawed in a microwave oven. The flavor and texture of the pancake that had thus been heated and thawed were evaluated in a manner similar to that described above.

The results are shown in Table 11.

TABLE 11

|  | Freshly made | | | | | After storage in a refrigerator | | | | | Heated and thawed after storage in a freezer | | | | |
| --- | --- | --- | --- | --- | --- | --- | --- | --- | --- | --- | --- | --- | --- | --- | --- |
|  | Flavor | | Texture | | | Flavor | | Texture | | | Flavor | | Texture | | |
|  |  |  | Touch to the | Hard- | Melt- |  |  | Touch to the | Hard- | Melt- |  |  | Touch to the | Hard- | Melt- |
| Test No. | Taste | Smell | teeth | ness | away | Taste | Smell | teeth | ness | away | Taste | Smell | teeth | ness | away |
| 1 | 4.7 | 4.6 | 4.7 | 4.7 | 4.6 | 4.4 | 4.1 | 3.3 | 2.6 | 2.8 | 4.2 | 3.8 | 2.9 | 3.0 | 2.5 |
| 2 | 4.7 | 4.6 | 4.7 | 4.7 | 4.6 | 4.5 | 4.1 | 3.7 | 4.3 | 3.2 | 4.4 | 3.9 | 3.9 | 3.9 | 3.7 |
| 3 | 4.7 | 4.6 | 4.6 | 4.7 | 4.6 | 4.5 | 4.0 | 3.9 | 4.4 | 3.6 | 4.4 | 4.0 | 4.2 | 4.3 | 3.9 |

TABLE 11-continued

|  | Freshly made | | | | | After storage in a refrigerator | | | | | Heated and thawed after storage in a freezer | | | | |
|---|---|---|---|---|---|---|---|---|---|---|---|---|---|---|---|
|  | Flavor | | Texture | | | Flavor | | Texture | | | Flavor | | Texture | | |
|  | | | Touch to the | Hard- | Melt- | | | Touch to the | Hard- | Melt- | | | Touch to the | Hard- | Melt- |
| Test No. | Taste | Smell | teeth | ness | away | Taste | Smell | teeth | ness | away | Taste | Smell | teeth | ness | away |
| 4 | 4.6 | 4.5 | 4.7 | 4.8 | 4.6 | 4.4 | 3.9 | 4.2 | 4.6 | 3.8 | 4.4 | 4.0 | 4.3 | 4.5. | 4.0 |
| 5 | 4.6 | 4.5 | 4.7 | 4.7 | 4.5 | 4.3 | 3.8 | 4.0 | 4.6 | 3.6 | 4.3 | 4.0 | 4.3 | 4.6 | 3.8 |
| 6 | 4.5 | 4.5 | 4.6 | 4.6 | 4.4 | 4.2 | 3.6 | 3.8 | 4.4 | 3.3 | 4.1 | 3.8 | 3.9 | 4.5 | 3.6 |
| 7 | 4.5 | 4.3 | 4.1 | 4.4 | 4.1 | 4.1 | 3.5 | 3.7 | 4.2 | 3.1 | 4.0 | 3.6 | 3.6 | 4.1 | 3.2 |
| 8 | 3.6 | 3.7 | 3.3 | 3.4 | 3.3 | 3.4 | 2.9 | 2.9 | 3.2 | 2.6 | 3.3 | 2.9 | 2.4 | 3.2 | 2.4 |
| 9 | 3.1 | 3.0 | 2.8 | 3.0 | 2.8 | 2.9 | 2.4 | 2.5 | 2.8 | 2.0 | 2.8 | 2.5 | 2.2 | 3.0 | 2.0 |
| 10 | 4.7 | 4.6 | 4.7 | 4.7 | 4.6 | 4.4 | 4.1 | 3.3 | 2.3 | 2.4 | 4.2 | 3.9 | 2.9. | 2.0 | 2.3 |
| 11 | 3.3 | 3.0 | 3.1 | 3.5 | 2.9 | 2.6 | 2.8 | 2.6 | 3.4 | 1.9 | 2.4 | 2.0 | 2.0 | 2.4 | 2.0 |
| 12 | 3.4 | 3.2 | 3.0 | 3.6 | 2.9 | 2.7 | 2.9 | 2.7 | 3.4 | 2.0 | 2.6 | 2.3 | 2.3 | 2.5 | 1.9 |
| 13 | 3.0 | 2.8 | 2.8 | 3.2 | 2.7 | 2.4 | 2.5 | 2.4 | 3.0 | 1.8 | 2.2 | 1.8 | 2.1 | 2.3 | 1.6 |

From Table 11 above, it is clear that the pancakes of the present invention in which waxy wheat flour was used together with soft wheat flour provide excellent texture with the characteristic flavor intrinsic to pancake not being impeded, as compared to pancakes prepared from any combination of soft wheat flour and waxy cornstarch, waxy rice flour, or tapioca starch, and to the pancake prepared from 100% normal soft wheat flour. Moreover, the pancakes of the present invention provide excellent flavor and texture when stored in refrigerators, or when heated and thawed in a microwave oven following storage in a frozen state.

Example 8

Flour blends were prepared by adding, to a commercially available wheat flour ("Tokusuzume," by Nisshin Flour Milling Co., Ltd.; moisture content 14%, ash content 0.38%, crude protein content 9.2%), the waxy wheat flour (amylose content 0%) obtained in Example 2 of Japanese Patent Application Laid-Open (Kokai) No. 6-125669 in the proportions as shown in Table 12. To 100 parts by weight of each of the resultant flour blends was added a NaCl solution prepared by adding 3 parts by weight of NaCl to 35 parts by weight of water. The mixture was mixed for 12 minutes to thereby obtain a crumbly dough. The dough was made into sheets by the use of noodle-making rolls provided with a roll clearance of 3.6 mm. The dough sheets were matured for 30 minutes in a plastic bag. Thereafter, the sheets were further rolled between noodle-making rolls to thereby form sheets having a thickness of about 2.5 mm. The sheets were cut into noodle strings by the use of a No. 10 cutter, to thereby obtain raw noodles (nama-udon). The raw noodles were boiled in a sufficient amount of boiling water (with pH being adjusted to 5–6 with a pH regulator) in 100 g portions. Immediately after being boiled, the noodles were washed with cold water, and then drained. The boiled noodles were weighed, and a boiling yield was obtained. The boiling time was adjusted so that the boiling yield fell within the range of 310±5%.

The boiled noodles were subjected to a sensory evaluation performed by 10 skilled panelists. The evaluation standards are shown in Tables 14 through 18.

For comparison, the following wheat flour samples were processed into noodles, and the noodles were then boiled, washed, drained, and evaluated as described above: the aforementioned commercially available wheat flour that did not contain waxy wheat flour, and the aforementioned commertially available wheat flour to which waxy rice flour, waxy cornstarch, or tapioca starch had been added in proportions shown in Table 13.

The waxy wheat flour used in the test had undergone the following treatment before being subjected to the test: Hydration so as to achieve a moisture content of 14.5%, tempering in a plastic bag so as to avoid drying, and milling with a Buehler experimental mill (yield 60%, moisture content 14.6%, ash content 0.44%, and crude protein content 13.6%).

The results of the sensory test are shown in Tables 12 and 13.

TABLE 12

| | Commercial wheat flour | waxy wheat flour | Results of Sensory Test | | | | |
|---|---|---|---|---|---|---|---|
| Test | | | Texture | | | | |
| No. | (%) | (%) | Viscoelasticity | Hardness | Smoothness | Flavor | Taste |
| 1 | 98 | 2 | 3.2 | 3.0 | 3.0 | 2.0 | 3.0 |
| 2 | 95 | 5 | 3.3 | 3.0 | 3.0 | 2.0 | 3.0 |
| 3 | 90 | 10 | 3.6 | 2.8 | 3.0 | 2.0 | 3.0 |
| 4 | 80 | 20 | 3.9 | 2.7 | 3.0 | 2.1 | 3.0 |
| 5 | 70 | 30 | 4.1 | 2.5 | 3.0 | 2.1 | 3.0 |
| 6 | 60 | 40 | 4.2 | 2.4 | 3.0 | 2.2 | 3.0 |
| 7 | 50 | 50 | 4.3 | 2.4 | 3.0 | 2.2 | 3.0 |
| 8 | 40 | 60 | 4.5 | 2.3 | 3.0 | 2.1 | 3.0 |
| 9 | 30 | 70 | 4.5 | 2.2 | 3.0 | 2.1 | 3.0 |

TABLE 12-continued

| Test No. | Commercial wheat flour (%) | waxy wheat flour (%) | Results of Sensory Test Texture Viscoelasticity | Hardness | Smoothness | Flavor | Taste |
|---|---|---|---|---|---|---|---|
| 10 | 20 | 80 | 4.7 | 1.9 | 3.0 | 2.2 | 3.0 |
| 11 | 10 | 90 | 5.0 | 1.8 | 3.0 | 2.1 | 2.9 |
| 12 | 5 | 95 | 5.0 | 1.5 | 3.0 | 2.2 | 2.9 |
| 13 | 2 | 98 | 5T.0 | 1.4 | 3.0 | 2.1 | 2.9 |
| 14 | 0 | 100 | 5.0 | 1.2 | 3.0 | 2.2 | 2.9 |

TABLE 13

| Test No. | Commercial flour (%) | Tapioca starch (%) | Waxy rice flour (%) | Waxy corn-starch (%) | Results of Sensory Test Texture Viscoelasticity | Hardness | Smoothness | Flavor | Taste |
|---|---|---|---|---|---|---|---|---|---|
| 15 | 100 | 0 | 0 | 0 | 3.0 | 3.0 | 3.0 | 2.0 | 3.0 |
| 16 | 80 | 20 | 0 | 0 | 4.0 | 2.2 | 3.4 | 1.4 | 2.0 |
| 17 | 80 | 0 | 20 | 0 | 3.3 | 2.6 | 2.8 | 1.6 | 1.5 |
| 18 | 80 | 0 | 0 | 20 | 4.1 | 2.4 | 3.2 | 1.0 | 1.5 |

TABLE 14

Evaluation standards for viscoelasticity

| Rating | Evaluation |
|---|---|
| 1 | Absolutely no viscoelasticity as compared to the results from Test No. 15. Very rough texture |
| 2 | Weaker viscoelasticity as compared to the results from Test No. 15. Somewhat rough texture |
| 3 | Viscoelasticity comparable to the results from Test No. 15 |
| 4 | Somewhat stronger viscoelasticity as compared to the results from Test No. 15 Somewhat thick texture |
| 5 | Clearly stronger viscoelasticity as compared to the results from Test No. 15 Very thick texture |

TABLE 15

Evaluation standards for hardness

| Rating | Evaluation |
|---|---|
| 1 | Very soft compared to the results from Test No. 15 |
| 2 | Somewhat soft as compared to the results from Test No. 15 |
| 3 | Comparable to the results from Test No. 15 |
| 4 | Somewhat hard as compared to the results from Test No. 15 |
| 5 | Very hard as compared to the results from Test No. 15 |

TABLE 16

Evaluation standards for smoothness

| Rating | Evaluation |
|---|---|
| 1 | Very poor smoothness as compared to the results from Test No. 15 |
| 2 | Poor smoothness as compared to the results from Test No. 15 |
| 3 | Comparable to the results from Test No. 15 |
| 4 | Noticeably smooth as compared to the results from Test No. 15 |
| 5 | Very smooth as compared to the results from Test No. 15 |

TABLE 17

Evaluation standards for taste

| Rating | Evaluation |
|---|---|
| 1 | Unacceptable strange taste as compared to the taste in Test No. 15 |
| 2 | No distinguishable taste from the taste in Test No. 15 |
| 3 | Tasty as compared to Test No. 15, with a very agreeable taste as a udon noodle |

TABLE 18

Evaluation standards for flavor

| Rating | Evaluation |
|---|---|
| 1 | Unacceptable strange flavor (smell of cereals and starch) as compared to the results from Test No. 15 |
| 2 | Somewhat strange flavor as compared to the results from Test No. 15 |
| 3 | Comparable to the results from Test No. 15 |

As is understood from the above results, addition of small amounts of the waxy wheat flour improved the texture. Unlike the case of flours of different origins and the case of starch derived from flours of different origins, the glutinous wheat flour could be added in increased amounts. Moreover, when incorporated in increased amounts, the waxy wheat flour did not cause degradation in flavor or in taste. However, addition of waxy wheat flour in amounts of not less than 80% by weight was not preferred, because the texture of the resultant noodles became excessively viscoelastic and excessively soft, to thereby provide a texture quite different from that of conventional noodles.

Example 9

Flour blends were prepared by adding, to 50 parts by weight of a commercially available wheat flour (the same as that used in Example 8), 50 parts by weight of waxy wheat flour (the same as that used in Example 8) and NaCl solution prepared by adding 3 parts by weight of NaCl to 35 parts by weight of water. The mixture was processed into raw noodles (nama-udon) in a manner similar to that described in Example 8. The raw noodles were boiled in a sufficient amount of boiling water (with pH being adjusted to 5–6 with a pH regulator) so as to achieve a boiled noodle yield of 280%. Immediately after being boiled, the noodles were washed in cold water, drained, and packed in a plastic bag in portions of about 200 g each. The noodles were stored in a refrigerator for 2 days. The boiled noodles thus stored in the refrigerator were boiled for 1 minute in a sufficient amount of boiling water. Immediately after being boiled, the noodles were washed in cold water, drained, and subjected to a sensory evaluation in terms of texture. For comparison, there were used boiled noodles that had been prepared from the aforementioned commercially available wheat flour only (i.e., no waxy wheat flour was used) in a manner identical with that performed for preparing the noodles of the present invention.

Evaluation conducted by 10 expert panelists revealed that specimens of the present invention provided an excellent texture, i.e., viscoelastic texture, as compared to the comparative specimens. Thus, the results of the evaluation demonstrated that addition of waxy wheat flour was effective in improving the texture of boiled noodles.

Example 10

Flour blends were prepared by adding, to 50 parts by weight of a commercially available wheat flour (the same as that used in Example 8), 50 parts by weight of waxy wheat flour (the same as that used in Example 8) and NaCl solution prepared by adding 3 parts by weight of NaCl to 35 parts by weight of water. The mixture was processed into raw noodles (nama-udon) in a manner similar to that described in Example 8. The raw noodles were boiled in a sufficient amount of boiling water (with pH being adjusted to 5–6 with a pH regulator) so as to achieve a boiled noodle yield of 280%. Immediately after being boiled, the noodles were washed in cold water, cooled on iced water, drained, and placed on trays (about 200 g per tray). The noodles were frozen for 1 hour in a deep freezer. The frozen noodles, being transferred from the trays into plastic bags, were stored for 10 days in a freezer. The frozen noodles were boiled for 1 minute in a sufficient amount of boiling water. Immediately after being boiled, the noodles were washed in cold water, drained, and subjected to a sensory evaluation in terms of texture. For comparison, there were used frozen noodles that had been prepared from the sole use of the aforementioned commercially available wheat flour (i.e., no waxy wheat flour was used) in a manner identical with that performed for preparing the noodles of the present invention.

Evaluation conducted by 10 expert panelists revealed that specimens of the present invention provided a remarkably excellent texture, i.e., considerably viscoelastic texture, as compared to the comparative specimens. Thus, the results of the evaluation demonstrated that addition of waxy wheat flour was effective in improving the texture of frozen noodles.

Example 11

Flour blends were prepared by adding, to 80 parts by weight of a commercially available wheat flour ("Toku No. 1," by Nisshin Flour Milling Co., Ltd.; moisture content 14.2%, ash content 0.34%, crude protein content 11.2%), 20 parts by weight of waxy wheat flour (the same as that used in Example 8). To each flour blend was added a kansui solution prepared by dissolving 1.2 parts by weight of kansui (product of Oriental Yeast Industries, Co., Ltd., Hiryu-Red; $K_2CO_3$ 60% and $Na_2CO_3$ 40%) in 32 parts by weight of water. The resultant mixture was mixed for 12 minutes to thereby obtain a crumbly dough. The dough was made into sheets by the use of noodle-making rolls provided with a roll clearance of 3.0 mm. The dough sheets were matured for 30 minutes in a plastic bag. Thereafter, the sheets were further rolled between noodle-making rolls to thereby form sheets having a thickness of about 1.4 mm. The sheets were cut into noodle strings by the use of a No. 20 cutter. The noodle strings were put in a plastic bag and allowed to stand overnight at room temperature, to thereby obtain raw Chinese type noodles. The thus-obtained raw Chinese type noodles were boiled in a sufficient amount of boiling water for 2.5 minutes. Immediately thereafter, the noodles were drained and transferred into a bowl containing hot water. Evaluation in terms of texture was performed immediately. For comparison, there were used boiled Chinese type noodles that had been prepared from the sole use of the aforementioned commercially available wheat flour (i.e., no waxy wheat flour was used) in a manner identical with that performed for preparing the Chinese type noodles of the present invention.

Evaluation conducted by 10 expert panelists revealed that specimens of the present invention provided an excellent texture, i.e., provided favorable resistance to mastication with no rough texture, as compared to the comparative specimens. Thus, the results of the evaluation demonstrated that addition of waxy wheat flour was effective in improving the texture of boiled Chinese type noodles.

The whole contents of Japanese Patent Application Nos. 6523/96, 6524/96, and 6525/96 are incorporated herein by reference.

We claim:

1. A flour blend for breads, cakes, or noodles, the flour blend containing waxy wheat flour, wherein in the case of breads the content of the waxy wheat flour is between 0.5 and 30%, in the case of cakes the content of the waxy wheat flour is between 1 and 30%, in the case of noodles the content of the waxy wheat flour is between 5 and 70%.

2. The flour blend acording to claim 1, wherein the waxy wheat flour is a wheat flour with an amylose content of not more than 10%.

3. The flour blend according to claim 1, which further contains one or more members selected from the group consisting of non-waxy wheat flour, rye flour, starch, buckwheat flour, rice flour, and barley flour.

4. The flour blend according to claim 1, wherein the content of waxy wheat flour is between 0.5 and 70% by weight.

5. The flour blend according to claim 1, wherein the content of waxy wheat flour is between 1 and 20% by weight, and the flour blend is for preparing breads.

6. The flour blend according to claim 1, wherein the content of waxy wheat flour is between 1 and 20% by weight, and the flour blend is for preparing cakes.

7. The flour blend according to claim 1, wherein the content of waxy wheat flour is between 10 and 60% by weight, and the flour blend is for preparing noodles.

8. Foods selected from the group consisting of breads, cakes, and noodles, which foods are prepared from a flour blend containing waxy wheat flour, wherein in the case of breads the content of the waxy wheat flour is between 0.5 and 30%, in the case of cakes the content of the waxy wheat flour is between 1 and 30%, in the case of noodles the content of the waxy wheat flour is between 5 and 70%.

9. Foods according to claim 8, wherein the waxy wheat flour is a wheat flour with an amylose content of not more than 10%.

10. The foods according to claim 8, wherein the flour blend contains one or more members selected from the group consisting of non-waxy wheat flour, rye flour, starch, buckwheat flour, rice flour, and barley flour.

11. The foods according to claim 8, wherein the content of waxy wheat flour in the flour blend is between 0.5 and 70% by weight.

12. The foods according to claim 8, wherein the content of waxy wheat flour in the flour blend is between 1 and 20% by weight, and the flour blend is for preparing breads.

13. The foods according to claim 8, wherein the content of waxy wheat flour in the flour blend is between 1 and 20% by weight, and the flour blend is for preparing cakes.

14. The foods according to claim 8, wherein the content of waxy wheat flour in the flour blend is between 10 and 60% by weight, and the flour blend is for preparing noodles.

15. The flour blend according to claim 1, wherein the breads, cakes, and noodles have an excellent texture and taste not only immediately after preparation, but also after storage in a refrigerator or a freezer and subsequent heating and thawing in a microwave oven.

16. The flour blend according to claim 5, wherein the breads have an excellent texture and taste not only immediately after preparation, but also after storage in a refrigerator or a freezer and subsequent heating and thawing in a microwave oven.

17. The flour blend according to claim 6, wherein the cakes have an excellent texture and taste not only immediately after preparation, but also after storage in a refrigerator or a freezer and subsequent heating and thawing in a microwave oven.

18. The flour blend according to claim 7, wherein the noodles have an excellent texture and taste not only immediately after preparation, but also after storage in a refrigerator or a freezer and subsequent heating and thawing in a microwave oven.

19. The foods according to claim 8, wherein the breads, cakes, and noodles have an excellent texture and taste not only immediately after preparation, but also after storage in a refrigerator or a freezer and subsequent heating and thawing in a microwave oven.

20. The foods according to claim 12, wherein the breads have an excellent texture and taste not only immediately after preparation, but also after storage in a refrigerator or a freezer and subsequent heating and thawing in a microwave oven.

21. The foods according to claim 13, wherein the cakes have an excellent texture and taste not only immediately after preparation, but also after storage in a refrigerator or a freezer and subsequent heating and thawing in a microwave oven.

22. The foods according to claim 14, wherein the noodles have an excellent texture and taste not only immediately after preparation, but also after storage in a refrigerator or a freezer and subsequent heating and thawing in a microwave oven.

* * * * *